United States Patent [19]
Yamane

[11] Patent Number: 6,026,775
[45] Date of Patent: Feb. 22, 2000

[54] INTAKE SYSTEM OF ENGINE

[75] Inventor: Syuichi Yamane, Shizuoka-ken, Japan

[73] Assignee: Suzuki Motor Corporation, Shizuoka-ken, Japan

[21] Appl. No.: 09/012,763

[22] Filed: Jan. 23, 1998

[30] Foreign Application Priority Data

Jan. 31, 1997 [JP] Japan ..................................... 9-032873

[51] Int. Cl.⁷ ................................................. F02M 35/00
[52] U.S. Cl. ............................... 123/184.53; 123/184.24; 123/184.57; 123/184.47; 123/184.21
[58] Field of Search ........................ 123/184.24, 184.25, 123/184.26, 184.34, 184.35, 184.36, 184.42, 184.43, 184.44, 184.47, 184.48, 184.49, 184.53, 184.57, 184.59

[56] References Cited

U.S. PATENT DOCUMENTS

| | | | |
|---|---|---|---|
| 4,444,013 | 4/1984 | Inoue et al. ............................ | 60/605.1 |
| 5,002,021 | 3/1991 | Nakata et al. ....................... | 123/184.42 |
| 5,040,495 | 8/1991 | Harada et al. ....................... | 123/184.57 |
| 5,116,231 | 5/1992 | Oki et al. ............................. | 123/184.57 |
| 5,477,819 | 12/1995 | Kopec .................................. | 123/184.42 |
| 5,647,314 | 7/1997 | Matsumura et al. ................ | 123/184.57 |

*Primary Examiner*—Noah P. Kamen
*Assistant Examiner*—Hai Huynh
*Attorney, Agent, or Firm*—Flynn, Thiel, Boutell & Tanis, P.C.

[57] ABSTRACT

An intake system for an engine has an intake manifold attached to the engine. A surge tank is attached to the engine and is located rearwardly of the engine. An air cleaner is attached to the engine and is located on one side of the engine. A resonator or intercooler is attached to the engine and is located adjacent the surge tank and the air cleaner. The resonator or intercooler is located above the engine such that the system is compactly arranged on the engine which results in an engine that takes up less space, is easier to assemble and is better isolated from the car body to reduce vibrations.

12 Claims, 9 Drawing Sheets

INTAKE SYSTEM OF ENGINE

FIELD OF THE INVENTION

The present invention relates to an intake system of an engine, and more particularly to an intake system of an engine in which parts of the intake system are disposed collectedly so that the space within the engine compartment can be effectively utilized.

BACKGROUND OF THE INVENTION

Within an engine compartment of a vehicle, there are disposed an engine and parts of the intake system such as an air cleaner. In a conventional arrangement as shown in FIG. 10, there are disposed an engine 302, an intake manifold 304 attached to the engine 302, a surge tank 306 connected to the intake manifold 304, and a throttle body 308 attached to the surge tank 306. On a side fixed to the vehicle body, there are disposed an air cleaner 310 and a resonator 314 connected to the air cleaner 310 through an intake pipe 312. The resonator 314 is connected with an intake nozzle 316. Further, the air cleaner 310 and the throttle body 308 are connected by a connection hose 320 formed with an accordion portion 318. The connection hose 320 is flexible to absorb vibration and relative movement at the accordion portion 318.

In the conventional intake system of an engine, the lengths and diameters of the intake pipe and the connection hose, as well as the capacities of the resonator and the air cleaner, are determined in order to obtain a satisfactory output performance and a noise performance of the engine, and therefore a large space has been required to lay out these parts of the intake system. The large area taken up by the prior art intake system is a disadvantage. As shown in FIG. 10, the resonator 314 and the air cleaner 310 are fixedly installed on the vehicle body side, and hence there has been difficulty in that vibrations due to pulsating motions of these parts are easily propagated from the air cleaner side to the vehicle body side.

Since the engine causes vibrations and shakings, it has been necessary to use a connection hose formed with an accordion rubber hose for connecting the engine with the air cleaner fixed to the side of the vehicle body. This creates difficulties, however, since the connection hose is liable to break, and a large-sized connection hose has to be used because of the accordion form and accordingly its outer diameter is undesirably large.

Further, in the process of assembling the parts of the intake system to an internal combustion engine at the factory, a processing step is required to connect the air cleaner to the connection hose after the engine has been mounted in the vehicle body. The overall assembling process is accordingly increased.

SUMMARY OF THE INVENTION

In order to overcome or minimize the above-mentioned difficulties, the present invention relates to an intake system of an engine having an intake manifold, a surge tank, an air cleaner, and a resonator attached to the engine, wherein the surge tank is disposed in the rear of the engine, the air cleaner is disposed at one side of the engine, and the resonator is disposed adjacent to the surge tank and the air cleaner.

In the present invention, the parts of the intake system of the engine can be disposed collectively and compactly, whereby the space within the engine compartment can be effectively utilized, the propagation of vibrations from the air cleaner and the like can be reduced, the assembling process in the factory can be reduced, and, in addition, the vibration or shaking absorbing function of the connection hose of the air cleaner can be dispensed with so that a small connection hose can be used.

DETAILED DESCRIPTION

An embodiment of the invention will be described in detail with reference to FIGS. 1–9 which show an embodiment of the invention.

Figure 1:
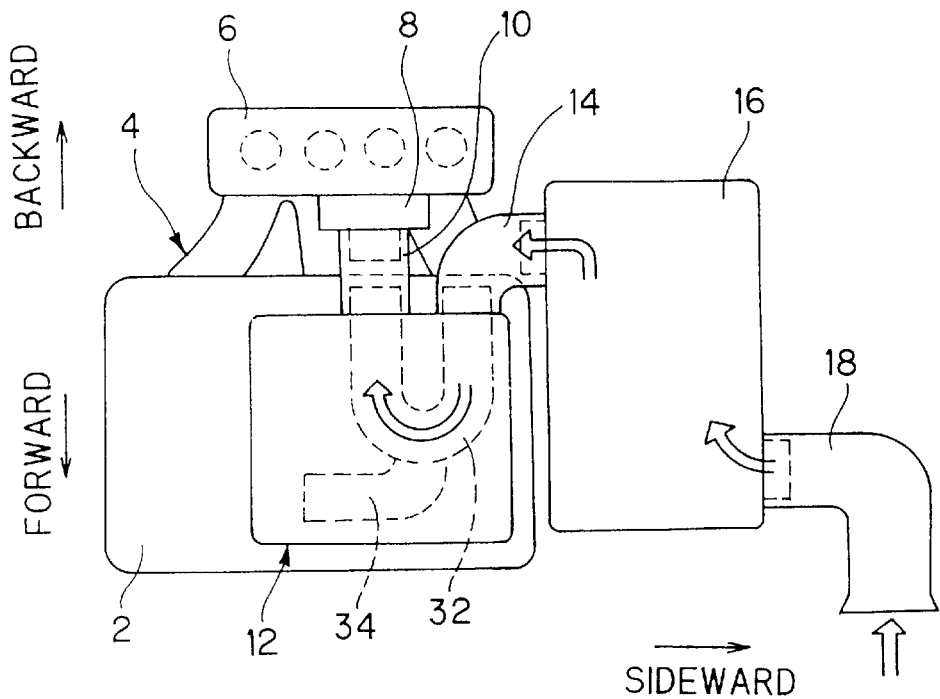
FIG. 1 is a diagrammatic plan view of an intake system of an engine.
Figure 2:
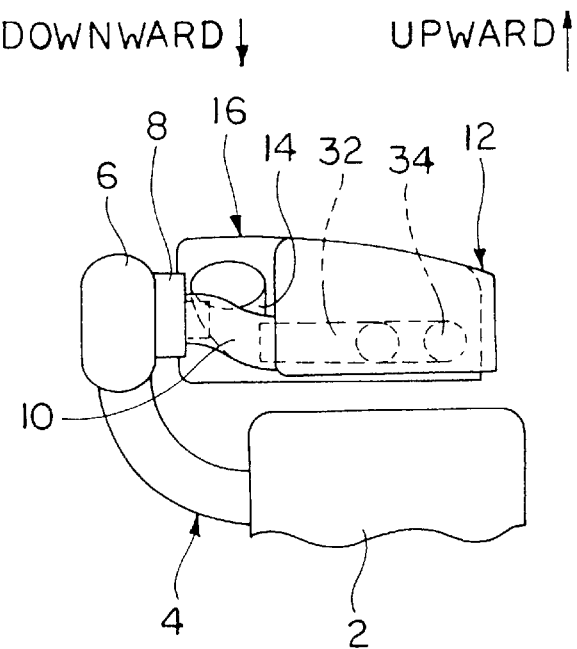
FIG. 2 is a side view of the intake system shown in FIG. 1.
Figure 3:
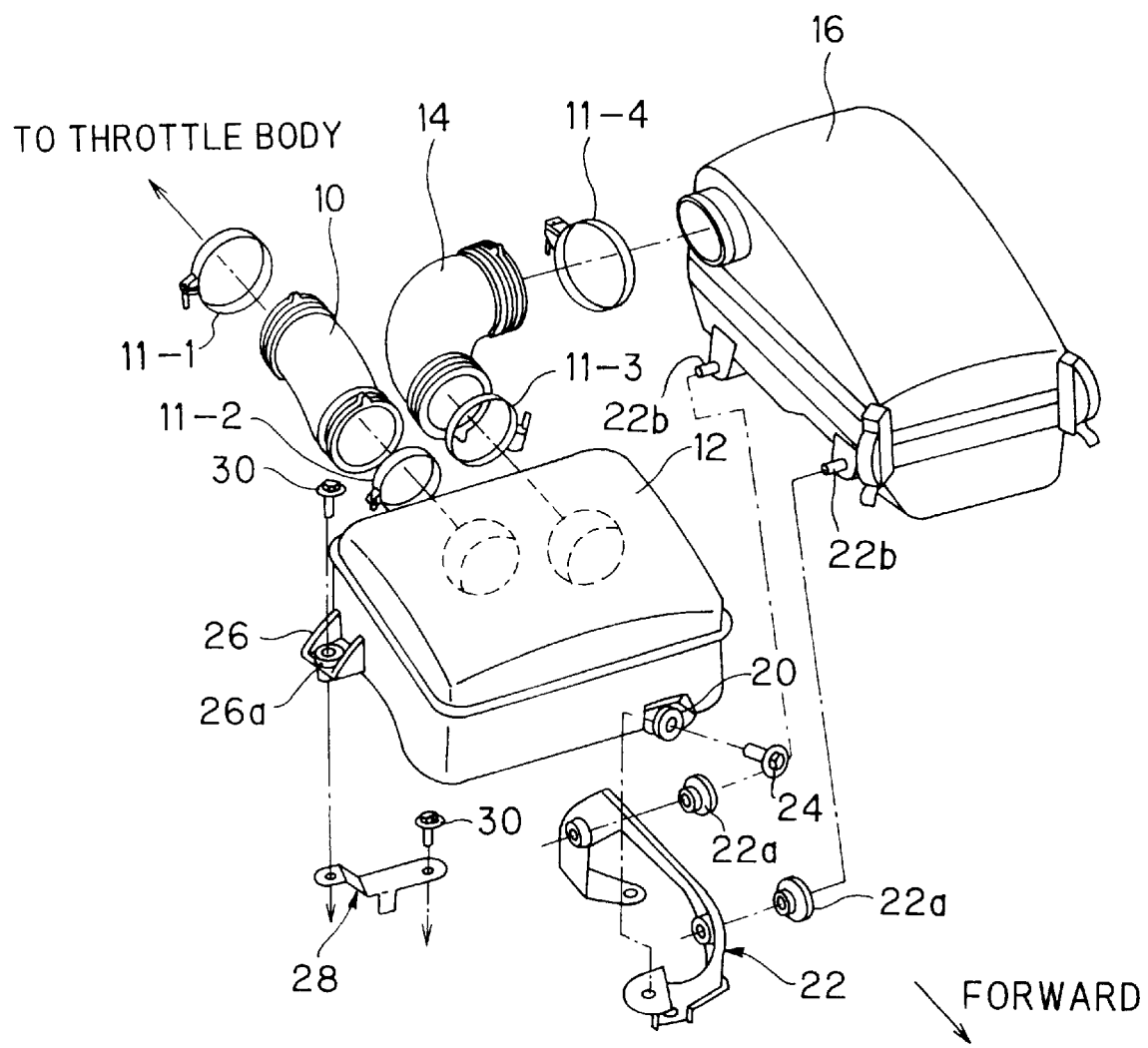
FIG. 3 is an exploded perspective view of the intake system of FIGS. 1 and 2.

Referring to FIGS. 1–3, reference numeral 2 denotes an engine installed within an engine room (not shown) of a vehicle. The engine 2 is provided with an intake manifold 4 extending rearwardly therefrom. The intake manifold 4 is connected with a surge tank 6 situated upwardly and rearwardly of the engine 2. The surge tank 6 is arranged with its longitudinal direction directed generally parallel to the longitudinal direction of the engine 2, which latter direction extends generally transversely (i.e. sideward) relative to the front-to-back vehicle direction.

The surge tank 6 is provided with a throttle body 8 attached thereto. The throttle body 8 is connected with one end of a first flexible connection hose 10 by a first clamp 11-1. The other end of the first connection hose 10 is connected to a resonator 12 by a second clamp 11-2.

The resonator 12 is box-shaped and disposed above the engine 2. The resonator 12 is connected with one end of a second flexible connection hose 14 by a third clamp 11-3. The other end of the second connection hose 14 is connected to an air cleaner 16 situated at one side of the engine 2 by a fourth clamp 11-4. Like the resonator 12, the air cleaner 16 is box-shaped.

The resonator 12 is located adjacent to but forwardly of the surge tank 6, and is also located sidewardly adjacent the air cleaner 16, all of which are at an elevation generally above the engine 2. The air cleaner 16 is connected with an intake nozzle 18 for taking in air.

The resonator 12, as shown in FIG. 3, is fixedly attached to the top portion of the engine 2 by a first support bolt 24 which is inserted into a first fixed bracket 20 on one side face thereof and into a first bracket 22, the latter being fixed to the engine. A second support bolt 30 is inserted into a second fixed bracket 26 on another side face of the resonator, and into a second attachment bracket 28, through a rubber bushing 26a on the resonator side, which bracket 28 is also attached to the engine. The first and second bolts 24 and 30 are fixed into the top portion of the engine 2. The air cleaner 16 is fixed to one side of the top portion of the engine 2 by the use of the first attached bracket 22. As shown in FIG. 3, the air cleaner housing has a pair of sidewardly projecting mounting pins 226 which are engaged through rubber bushings 22a carried on the bracket 22.

Within the resonator 12, as shown in FIGS. 1 and 2, there is provided an intermediate intake pipe 32 causing the first connection hose 10 to communicate with the second connection hose 14 for the purpose of providing a predetermined intake pipe length. The intermediate intake pipe 32 is provided with a resonator relieving pipe 34 which opens into the resonator 12.

Figure 4:
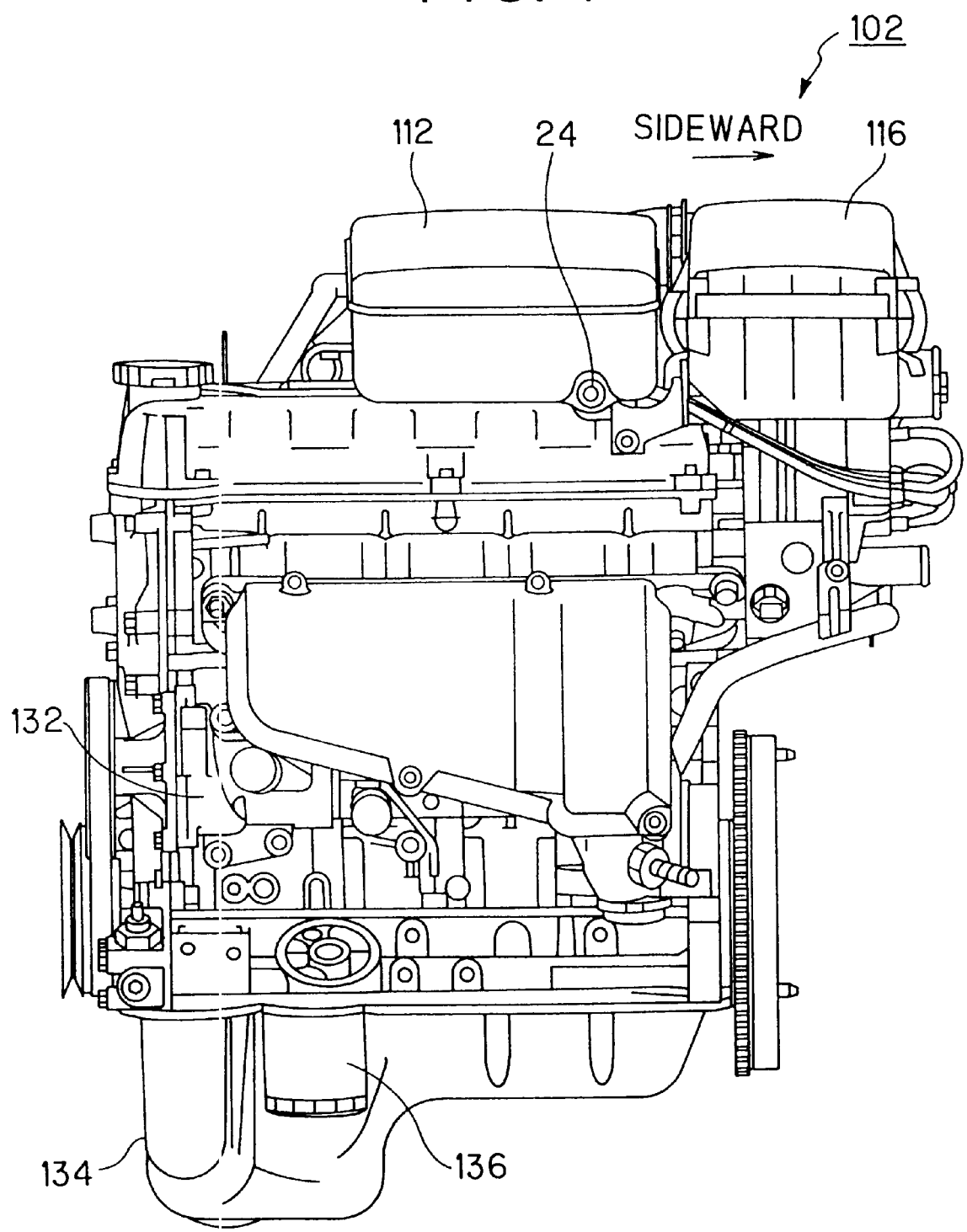
FIG. 4 is a front view of an internal combustion engine of a natural intake type.
Figure 5:
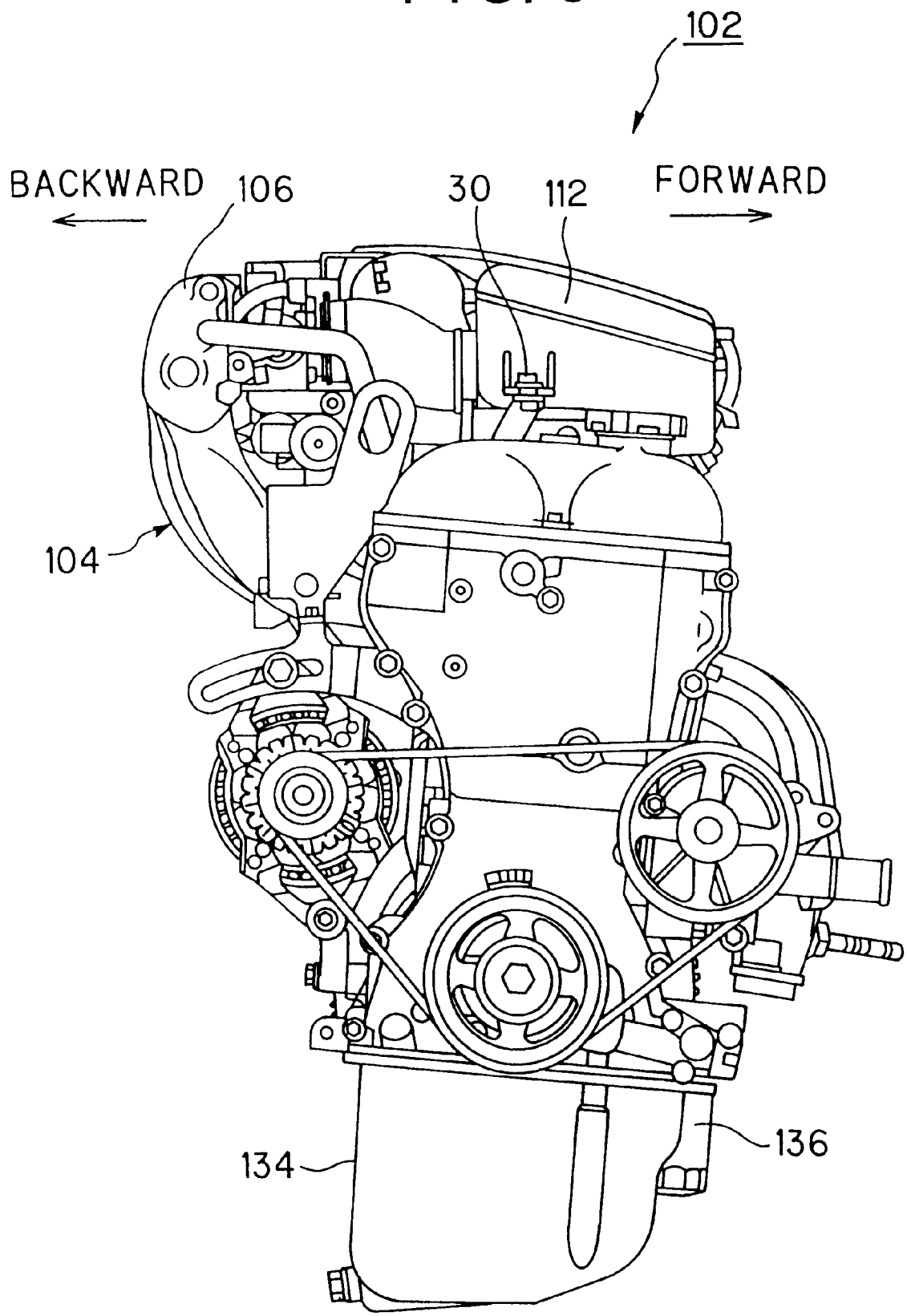
FIG. 5 is a side view of the internal combustion engine shown in FIG. 4.
Figure 6:
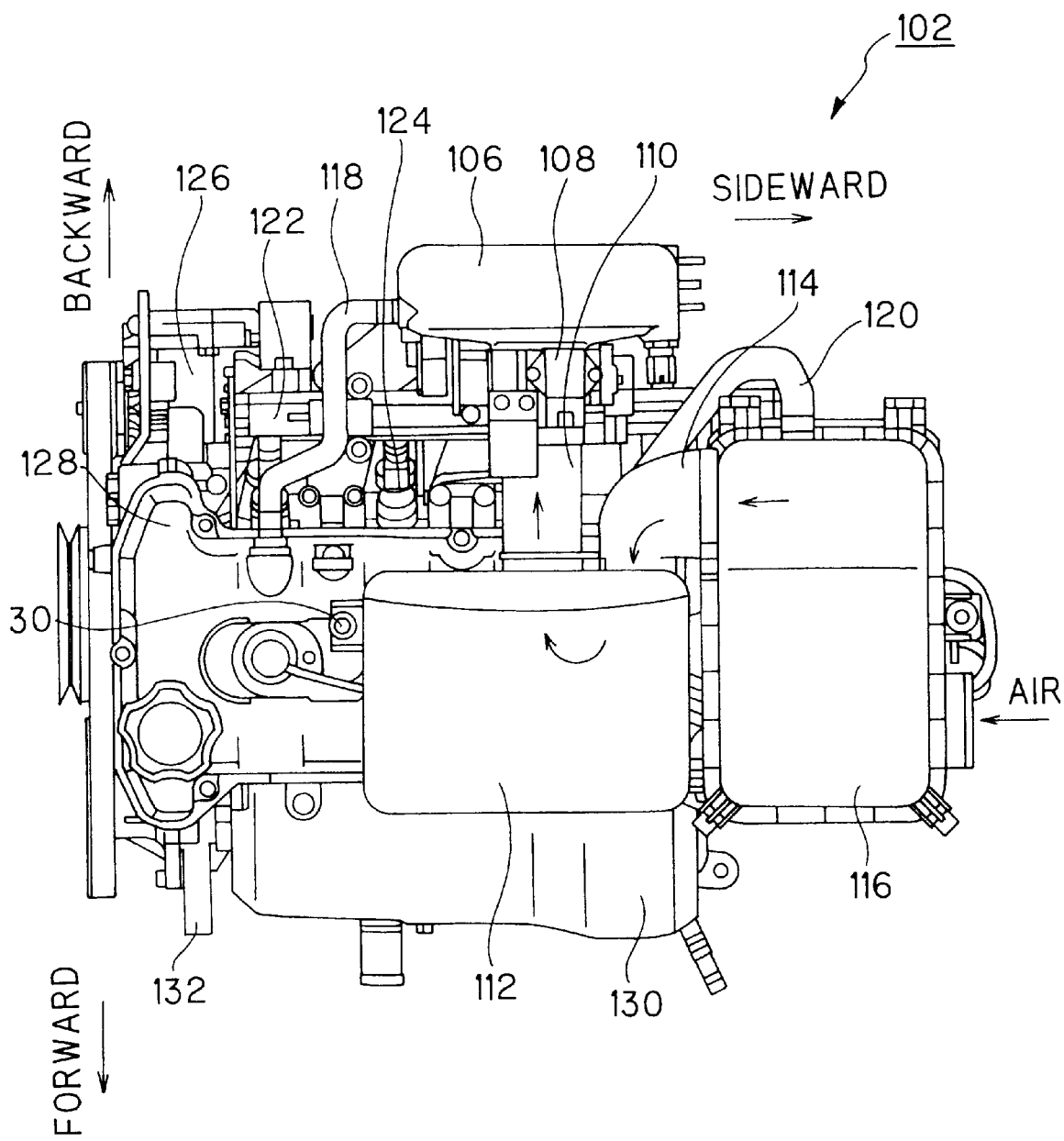
FIG. 6 is a plan view of the internal combustion engine shown in FIG. 4.

Reference is now made to FIGS. 4–6 which illustrate in greater detail a natural intake type of engine incorporating thereon the intake system of the present invention. The corresponding parts of the intake system diagrammatically illustrated in FIGS. 1–3, as incorporated into the engine shown in FIGS. 4–6, are identified by the same reference numerals increased by "100".

More specifically, and referring to FIGS. 4–6, there is illustrated an engine 102 of a natural intake type, an intake manifold 104, a surge tank 106, a throttle body 108, a first connection hose 110, a resonator 112, a second connection hose 114, and an air cleaner 116. The surge tank 106, resonator 112 and air cleaner 16 are all arranged adjacent to each other above the engine 102 substantially as described above relative to FIGS. 1–3. The air cleaner 116 is connected with an intake nozzle (not shown). Further, the internal combustion engine 102, as is conventional, is provided with a first blow-by gas pipe 118, a second blow-by gas pipe 120, a fuel delivery pipe 122, a fuel injection valve 124, conventional auxiliaries 126, a cylinder head cover 128, an exhaust manifold cover 130, a water pump 132, an oil pan 134, and an oil filter 136.

Figure 7:
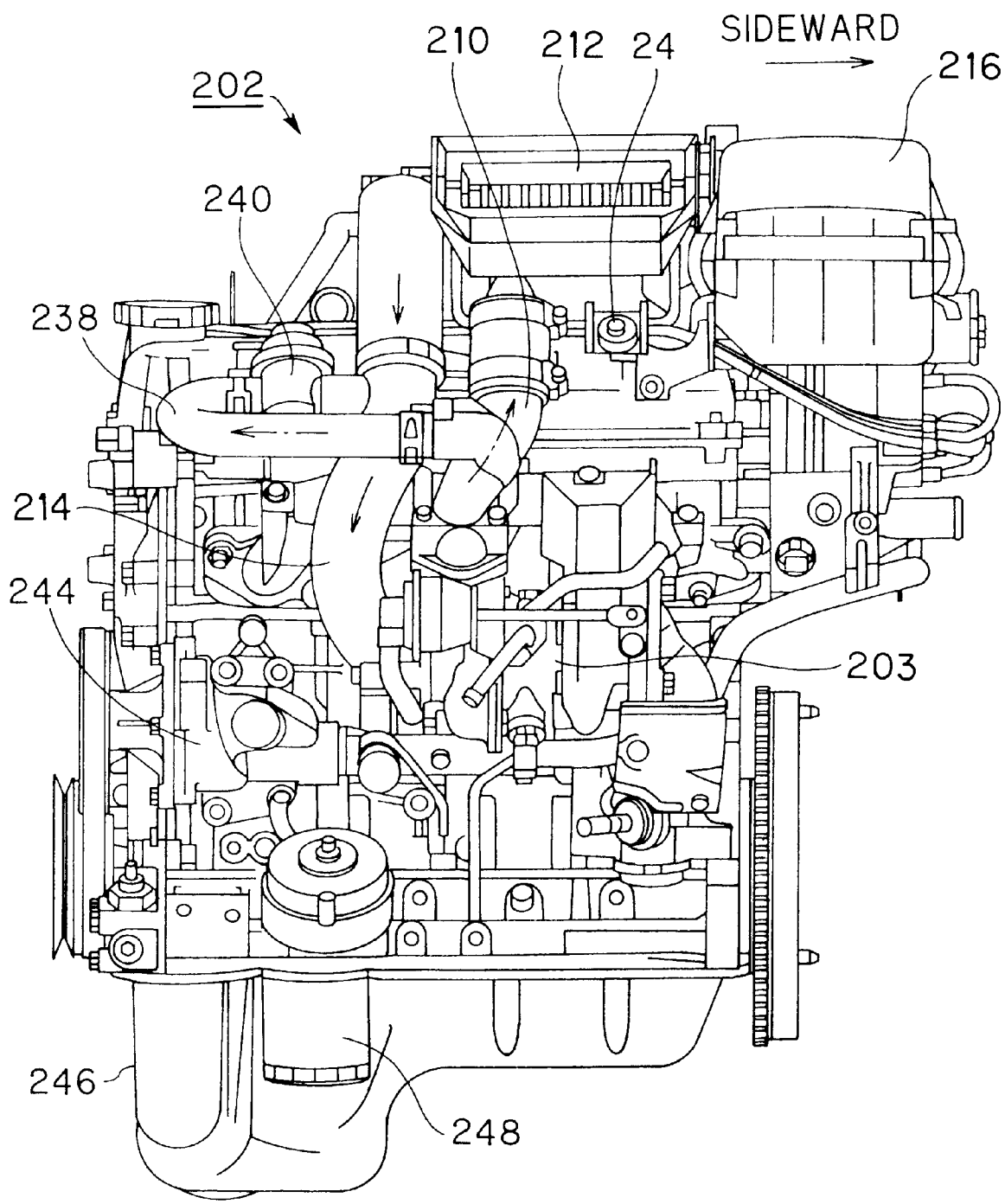
FIG. 7 is a front view of an internal combustion engine with a supercharger.
Figure 8:
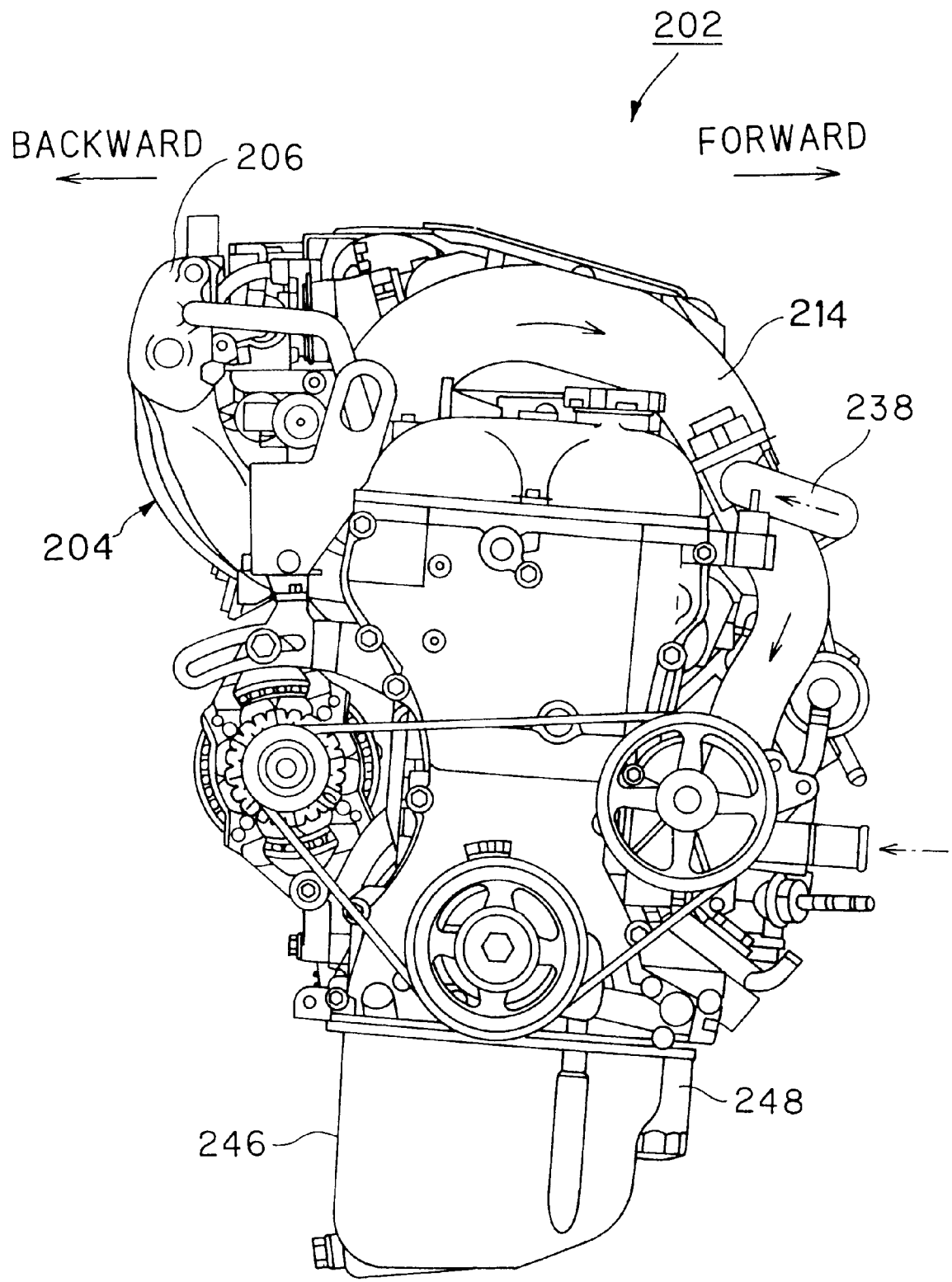
FIG. 8 is a side view of the internal combustion engine shown in FIG. 7.
Figure 9:
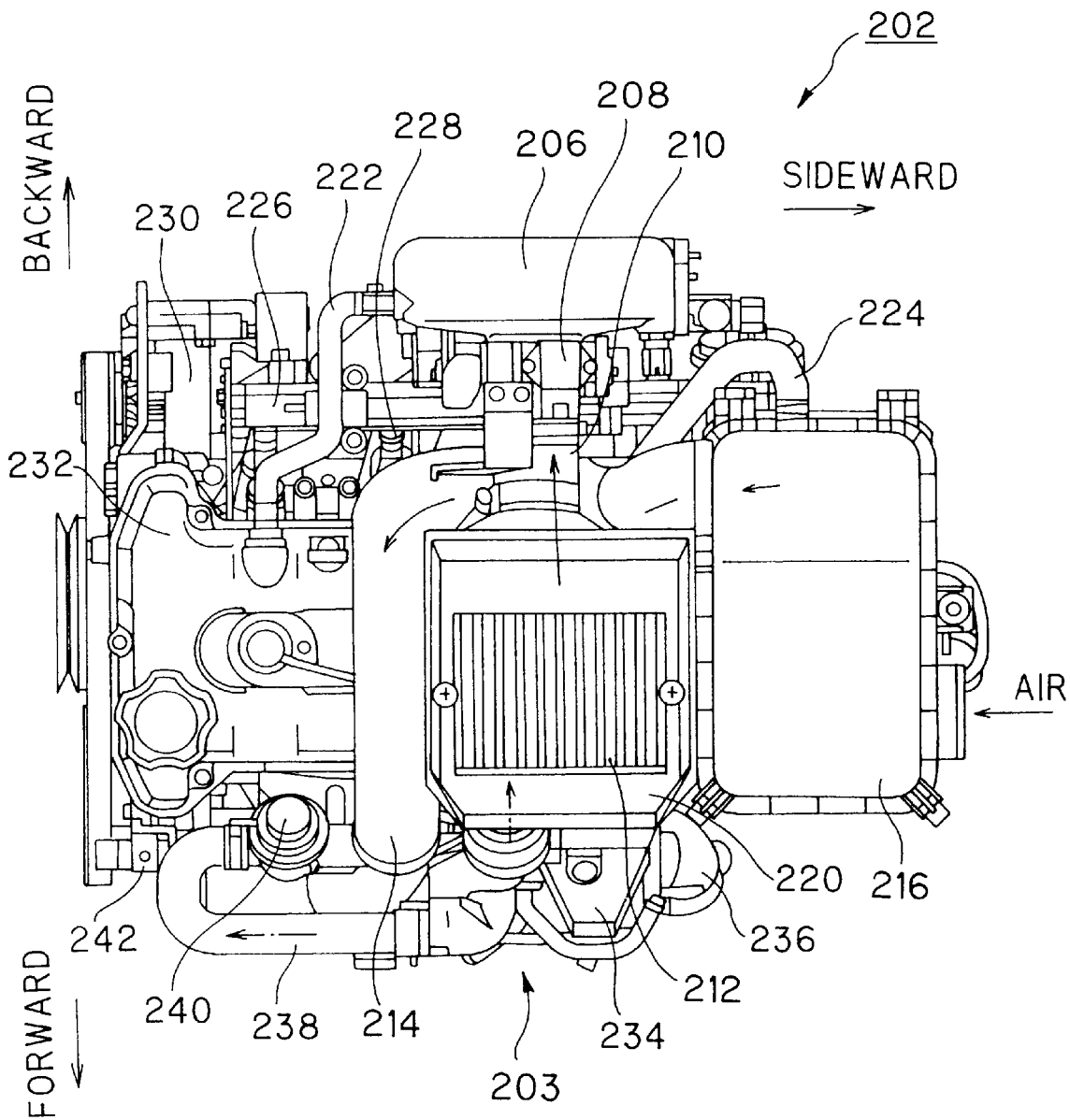
FIG. 9 is a plan view of the internal combustion engine shown in FIG. 7.
Figure 10:
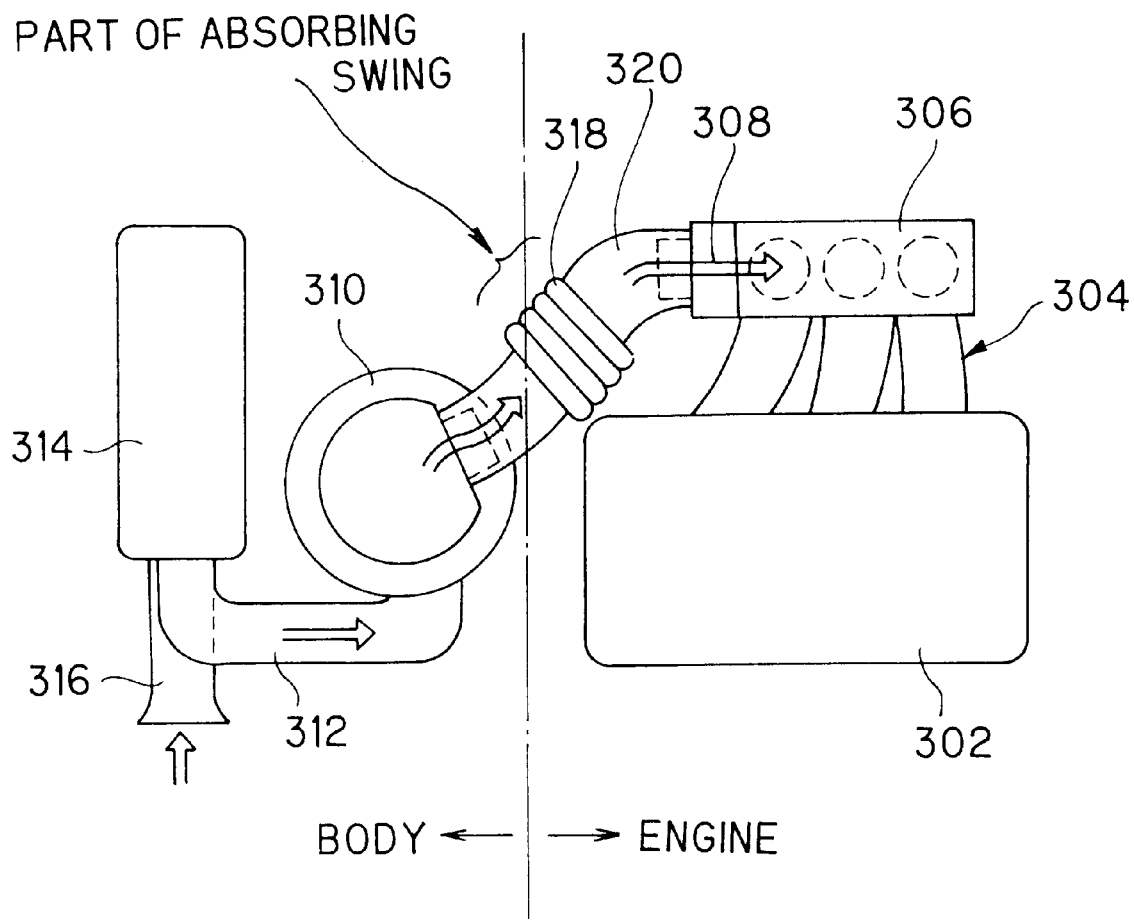
FIG. 10 is a plan view of an intake system of an engine according to the prior art.

Referring now to FIGS. 7–9, there is illustrated a further engine which is of the supercharged type, which engine again incorporates therein an intake system which generally corresponds to that illustrated by FIGS. 1–3. The components of the intake system in FIGS. 7–9 are identified by the same reference numerals utilized in FIGS. 1–3 except they are increased by "200".

More specifically, as shown in FIGS. 7–9, an internal combustion engine 202 is provided with a supercharger 203, an intake manifold 204, a surge tank 206, a throttle body 208, a first connection hose 210, an intercooler 212, a second connection hose 214, and an air cleaner 216. Again, the surge tank 206, intercooler 212 (which replaces the resonator), and the air cleaner 216 are all arranged adjacent to each other above the internal combustion engine 202 substantially as described above relative to FIGS. 1–3. The air cleaner 216 is connected with an intake nozzle (not shown). The intercooler 212 is box-shaped and covered with a cooler cover 220. The internal combustion engine 202 is provided with a first blow-by gas pipe 222, a second blow-by gas pipe 224, a fuel delivery pipe 226, a fuel injection valve 228, conventional auxiliary equipment 230, a cylinder head cover 232, an exhaust manifold cover 234, an exhaust pipe 236, a bypass line 238 for the supercharger 203, an air bypass valve 240 substantially midway of the bypass line 238, a cam angle sensor 242, a water pump 244, an oil pan 246, and an oil filter 248.

The internal combustion engine 202 provided with the supercharger 203 shown in FIGS. 7–9 is virtually the same in structure as the internal combustion engine 102 of the natural intake type shown in FIGS. 4–6. The air cleaners 116 and 216 are located in the same position on the engines, and the intercooler 212 replaces the resonator 112, and is disposed in the same position above the engine.

In the engine of this invention, the surge tank, the resonator (or intercooler), and the air cleaner are disposed adjacent to each other and are all fixedly mounted directly on the engine. Further, the resonator (or intercooler) and the air cleaner are preferably box-shaped. Therefore, the parts of the intake system can be gathered closely adjacent and around the engine. Especially, they can be gathered above the engine 2 so that the space within the engine compartment can be utilized more effectively.

Since the resonator or intercooler is interposed between the first and second connection hoses, and in addition is directly fixed to the top portion of the engine, it is difficult for the vibrations from the air cleaner and the like to propagate. The propagation of the vibrations from the side of the air cleaner 16 are suppressed, and transmission of vibrations to the vehicle body are reduced.

At the time of assembling the parts of the intake system, and specifically the step of connecting the air cleaner to the second connection hose after the engine has been mounted in the vehicle, can be eliminated so that the assembling process on the assembly line can be simplified.

Further, since the vibration absorbing function of the first and second connection hoses is no longer needed, it is possible to form the first and second connection hoses of smaller size, which smaller hoses take up less space.

Still further, by the provision of the intermediate intake pipe 32 in the resonator or intercooler, the intake pipe length necessary for the engine can be obtained and necessary capacities of the resonator or intercooler and the air cleaner can also be obtained.

In the present invention, disposing the surge tank in the rear of the engine, by disposing the air cleaner at one side of the engine, and by disposing the resonator (or intercooler) above the engine adjacent to the surge tank and the air cleaner, the parts of the intake system of the engine are arranged in a compact manner. Therefore, the space within the engine compartment is effectively utilized and propagation of vibrations from the air cleaner and the like is reduced.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In an intake system of a vehicle internal combustion engine, said system including an intake manifold, a surge tank, an air cleaner, and a resonator or intercooler, the improvement wherein said surge tank is disposed at the rear of said engine, said air cleaner is disposed at one side of said engine, and said resonator or intercooler is fixedly disposed above the engine and adjacent to both said surge tank and said air cleaner, and said surge tank, said air cleaner, and said resonator or intercooler all being positioned such that upper surfaces thereof are located at substantially the same height above said engine.

2. In a system according to claim 1, wherein said surge tank, said air cleaner, and said resonator or intercooler are all positioned entirely above the engine.

3. In a system according to claim 2, wherein the engine is disposed in a vehicle engine compartment so that a crankshaft of the engine extends sidewardly relative to the front-to-back direction of the vehicle.

4. In a system according to claim 2, wherein said surge tank is fixedly mounted on and carried directly by said engine, and wherein said resonator or intercooler is fixedly mounted on and carried directly by said engine, whereby said resonator or intercooler is positioned closely adjacent but sidewardly of said air cleaner and is positioned closely adjacent but forward of said surge tank.

5. In a vehicle having a body defining an engine compartment, a multi-cylinder internal combustion engine positioned within said engine compartment, and an air intake system associated with said engine for supplying air thereto, said air intake system including an air cleaner which is coupled to and supplies air to an intermediate air connection box which in turn is coupled to and supplies air to a surge tank which in turn is coupled to and supplies air to an intake manifold which in turn is coupled to and supplies air to combustion chambers of the engine, comprising the improvement wherein said surge tank is directly attached to and carried by said engine and is disposed adjacent a rearward end of said engine, said air cleaner being fixedly attached to and carried directly by said engine adjacent one side thereof, said air cleaner and said surge tank both being disposed at an elevation generally above said engine, and said intermediate air connection box being positioned directly over and fixedly attached to and carried directly by said engine, said air connection box being disposed forwardly of and in adjacent relationship to said surge tank, said air connection box also being disposed closely adjacent and sidewardly from said air cleaner, the direct attachment of said surge tank, said air cleaner, and said intermediate air connection box to said engine reducing propagation of vibrations from said surge tank, said air cleaner, and said intermediate air connection box to said vehicle body.

6. In a vehicle according to claim 5, wherein said intake system includes a first connection hose joined between said surge tank and said air connection box, a second connection hose joined between said air connection box and said air cleaner, said air connection box including an intermediate air intake pipe associated therewith for providing a connection between said first and second connection hoses.

7. In a vehicle according to claim 6, wherein said air connection box comprises a resonator.

8. In a vehicle according to claim 6, wherein said air connection box comprises an intercooler for a supercharger.

9. In a vehicle according to claim 6, wherein said engine is disposed in said engine compartment so that the crankshaft axis extends sidewardly in transverse relation to the front-to-back orientation of the vehicle.

10. In a vehicle according to claim 6, wherein said first and second connection hoses are free of accordion portions.

11. In a vehicle according to claim 6, wherein said surge tank is fixedly and directly attached to said engine by a bracket.

12. In a vehicle according to claim 11, wherein said air cleaner is fixedly and directly attached to said engine by a bracket.

* * * * *